United States Patent
Alcove Clave et al.

(10) Patent No.: US 10,773,252 B2
(45) Date of Patent: Sep. 15, 2020

(54) CATALYST FOR TREATING AN EXHAUST GAS, AN EXHAUST SYSTEM AND A METHOD

(71) Applicant: JOHNSON MATTHEY PUBLIC LIMITED COMPANY, London (GB)

(72) Inventors: Silvia Alcove Clave, Reading (GB); Paul Andersen, Audubon, PA (US); Maria Brandmair, Redwitz an der Rodach (DE); Manop Huber, Royston (GB); Michael Nash, Royston (GB); David Repp, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/937,896

(22) Filed: Mar. 28, 2018

(65) Prior Publication Data

US 2018/0280946 A1    Oct. 4, 2018

Related U.S. Application Data

(60) Provisional application No. 62/478,833, filed on Mar. 30, 2017.

(30) Foreign Application Priority Data

Oct. 2, 2017    (GB) .................................. 1716063.1

(51) Int. Cl.
| | |
|---|---|
| *B01J 29/78* | (2006.01) |
| *B01D 53/86* | (2006.01) |
| *B01J 29/48* | (2006.01) |
| *B01D 53/14* | (2006.01) |
| *B01D 53/94* | (2006.01) |
| *F01N 3/20* | (2006.01) |
| *B01J 23/30* | (2006.01) |
| *B01J 23/28* | (2006.01) |

(52) U.S. Cl.
CPC .......... *B01J 29/78* (2013.01); *B01D 53/1431* (2013.01); *B01D 53/8628* (2013.01); *B01D 53/8665* (2013.01); *B01D 53/9418* (2013.01); *B01J 29/48* (2013.01); *B01D 2251/206* (2013.01); *B01D 2251/2062* (2013.01); *B01D 2251/2067* (2013.01); *B01D 2255/20707* (2013.01); *B01D 2255/20723* (2013.01); *B01D 2255/20769* (2013.01); *B01D 2255/20776* (2013.01); *B01D 2255/50* (2013.01); *B01D 2255/504* (2013.01); *B01D 2257/404* (2013.01); *B01D 2257/602* (2013.01); *B01D 2258/0233* (2013.01); *B01D 2258/0283* (2013.01); *B01D 2258/0291* (2013.01); *B01J 2229/186* (2013.01); *Y02E 50/12* (2013.01)

(58) Field of Classification Search
None
See application file for complete search history.

(56) References Cited

U.S. PATENT DOCUMENTS

| | | | |
|---|---|---|---|
| 5,512,259 A | 4/1996 | Hagenmaier et al. | |
| 2001/0004452 A1 | 6/2001 | Mathes et al. | |
| 2002/0004446 A1 | 1/2002 | Fischer | |
| 2008/0121142 A1* | 5/2008 | Comrie | B01D 53/508 106/707 |
| 2010/0058746 A1* | 3/2010 | Pfeifer | B01D 53/9468 60/297 |
| 2011/0146237 A1* | 6/2011 | Adelmann | B01D 53/9418 60/274 |
| 2013/0190166 A1 | 7/2013 | Kato et al. | |
| 2015/0071841 A1 | 3/2015 | Brandmair | |
| 2017/0292424 A1* | 10/2017 | Kippel | F01D 25/305 |

FOREIGN PATENT DOCUMENTS

| | | | |
|---|---|---|---|
| CN | 101422728 | * | 5/2009 |
| GB | 2506776 B | | 1/2016 |
| JP | 4994008 B2 | | 6/2008 |
| WO | WO-2014027207 A1 | | 2/2014 |
| WO | 2015036748 | | 3/2015 |

OTHER PUBLICATIONS

R. M. Barrer; Chemical Nomenclature and Formulation of Compositions of Synthetic and Natural Zeolites, Pure Appl. Chem. 51 (1979), pp. 1091 to 1100.
Kirk-Othmer, "Encyclopedia of Chemical Technology", 3rd Edition, vol. 15, John Wiley & Sons, New York, 1981, pp. 640 to 669.

* cited by examiner

*Primary Examiner* — Sheng H Davis

(57) ABSTRACT

A catalyst for treating an exhaust gas comprising $SO_2$, $NO_x$ and elemental mercury in the presence of a nitrogenous reductant comprises a composition containing oxides of: (i) Molybdenum (Mo) and/or Tungsten (W); (ii) Vanadium (V); (iii) Titanium (Ti), and (iv) an MFI zeolite, wherein the composition comprises, based on the total weight of the composition: (i) 1 to 6 wt % of $MoO_3$ and/or 1 to 10 wt % $WO_3$; and (ii) 0.1 to 3 wt % $V_2O_5$, and (iii) 48.5 to 94.5 wt % $TiO_2$; and (iv) 35 to 50 wt % MFI zeolite.

11 Claims, No Drawings

CATALYST FOR TREATING AN EXHAUST GAS, AN EXHAUST SYSTEM AND A METHOD

The present invention relates to a catalyst for treating an exhaust gas. In particular, it relates to a catalyst which maintains a high level of activity for oxidizing elemental mercury (Hg) contained in coal combustion exhaust gas and the like, as well as a high level of activity for reducing nitrogen oxides contained in the gas in the presence of a nitrogenous reductant, such as ammonia, and which minimizes the oxidation of $SO_2$ contained in the gas to $SO_3$. That is the catalyst is designed selectively to oxidize elemental mercury over oxidizing $SO_2$. The present invention also relates to an exhaust gas treatment method using the catalyst, and to an exhaust system for carrying out the method.

Power plants often utilize fossil fuels as the energy source, such as coal, oil or natural gas, and combustion of these fuels generates exhaust gas that must be treated to remove nitrogen oxides ($NO_x$), including NO (nitric oxide), $NO_2$ (nitrogen dioxide), and $N_2O$ (nitrous oxide). The exhaust generated in power plants is generally oxidative, and the $NO_x$ needs to be reduced selectively with a catalyst and a reductant, which is typically ammonia or a short-chain hydrocarbon. The process, known as selective catalytic reduction (SCR), was extensively investigated in the 1970s for removing $NO_x$ from power plant exhaust gas and the like.

Coal and oil contain various amounts of sulfur. Treatment of exhaust from these plants using SCR demands maintenance of a high $NO_x$ reduction efficiency while minimizing $SO_2$ oxidation. Many SCR catalysts are effective in converting $NO_x$ to nitrogen and water in the presence of ammonia. However, an undesirable side reaction, the oxidation of $SO_2$ to $SO_3$, commonly occurs along with $NO_x$ reduction. The formation of sulfur trioxide ($SO_3$), a component of acid rain, needs to be controlled.

Thus, a catalyst that maximizes the rate of $NO_x$ reduction ($kNO_x$) while minimizing the rate of $SO_2$ oxidation ($kSO_x$) is highly desirable. Therefore, in recent years, demand has arisen particularly for a $NO_x$-removal catalyst which produces a low amount of $SO_2$ oxidation. In general, such a $NO_x$-removal catalyst contains a small amount of vanadium, which is an active component of the catalyst.

It is known that Hg, Pb, F, and other trace components contained in flue gas discharged from power plants and factories of various types result in health problems. This is in addition to $NO_x$ and $SO_x$ contained in such flue gas.

It is therefore desirable to provide a catalyst which is able to selectively oxidize mercury which is discharged from a coal-fired boiler mostly in the form of elemental mercury having a high vapor pressure, while reducing $NO_x$ in the exhaust gas and while minimizing the oxidation of $SO_x$. In the conventional power plant SCR to catalysts, Hg oxidation activity is predominantly provided by vanadium oxide, which is an active component, and thus an activity of oxidizing elemental mercury (Hg) can be enhanced by increasing vanadium content (V content). However, since a vanadium oxide has not only high Hg oxidation activity but also $SO_2$ oxidation activity, an increase in V content promotes $SO_2$ oxidation, and the resultant $SO_3$ can contribute to smoke pollution and the formation of acid rain.

The highly volatile mercury (elemental mercury, Hg) is typically oxidized by V into a mercury compound (e.g., mercury chloride). Subsequently, the thus-oxidized mercury compound is removed together with combustion ash or gypsum by means of a wet scrubber, an electric dust collector or desulfurization apparatus provided downstream of the exhaust gas treatment system. In such known systems a catalyst containing titanium oxide, and an oxide of a metal (e.g., vanadium) serves as an active component.

Accordingly, SCR catalysts for coal-fired power plants are required to have relatively high SCR activity, relatively high Hg oxidation activity, and relatively low $SO_2$ oxidation activity. Literature accounts have shown that increasing vanadia and molybdena loads in plate-type SCR catalysts increases Hg oxidation activity.

Thus, a conventional catalyst faces a trade-off between Hg oxidation activity on the one hand and $SO_2$ oxidation activity on the other hand and typically fails to provide both relatively high Hg oxidation activity and relatively low $SO_2$ oxidation activity. In view of the foregoing, an object of the present invention is to overcome the trade-off problem of the conventional catalyst and to provide an exhaust-gas-purifying catalyst that meets the aforementioned requirement concerning Hg oxidation activity and $SO_2$ oxidation activity; i.e., an exhaust gas purifying catalyst which specifically reduces percent $SO_2$ oxidation, while maintaining percent Hg oxidation at a relatively high level.

WO 2014/027207 A1 discloses a catalyst composition for treating exhaust gas comprising a blend of a first component and second component, wherein the first component is an aluminosilicate or ferrosilicate molecular sieve component wherein the molecular sieve is either in $H^+$ form or is ion exchanged with one or more transition metals, and the second component is a vanadium oxide supported on a metal oxide support selected from alumina, titania, zirconia, ceria, silica, and combinations thereof. Also provided are methods, systems, and catalytic articles incorporating or utilizing such catalyst blends.

US 2002/004446 discloses a catalyst body for breaking down nitrogen oxide in a presence of a reducing agent, the catalyst body comprising: an active material containing a hydrogen-ion-exchanged, acid zeolite and an active component, said active material contains 40-60% by weight of said zeolite and 40-60% by weight of said active component, said active component contains 70-95% by weight of titanium dioxide, 2-30% by weight of tungsten trioxide, 0.1-10% by weight of aluminum oxide and 0.1-10% by weight of silicon dioxide.

US 2013/190166 A1 discloses a NOx reduction catalyst for exhaust gas, which is composed of a catalyst composition that comprises titanium (Ti), an oxide of phosphorous, molybdenum (Mo) and/or tungsten (W), oxide of vanadium (V), and high-silica zeolite that has an $SiO_2/Al_2O_3$ ratio of not less than 20 is obtained by kneading in the presence of water, drying and calcining (1) titanium oxide, and phosphoric acid or an ammonium salt of phosphoric acid in an amount of more than 1% by weight and not more than 15% by weight relative to the titanium oxide in terms of $H_3PO_4$, (2) an oxo acid or oxo acid salt of molybdenum (Mo) and/or tungsten (W) and an oxo acid salt of vanadium (V) or vanadyl salt respectively in an amount of more than 0% by atom and not more than 8% by atom relative to the titanium oxide and (3) high-silica zeolite in an amount of more than 0% by weight and not more than 20% by weight relative to the titanium oxide.

JP 4994008B discloses catalyst-packed layers are composed of first, second and third layers from an exhaust gas inlet part in this order. The first layer catalyst is composed of a component having reducing activity of nitrogen oxides by $NH_3$ or its precursor, and activity of oxidizing metallic mercury to oxidized mercury. The second layer catalyst is composed to have both of a first component having reducing activity of nitrogen oxides by $NH_3$ or its precursor and activity of oxidizing metallic mercury, and a second component having oxidizing decomposition activity of $NH_3$, catalyst surfaces being coated with the component having reducing activity of nitrogen oxides by $NH_3$ or its precursor and activity of oxidizing metallic mercury. The to third layer catalyst is composed of the same catalyst of the first or second layer.

WO 2015/036748 discloses a catalyst for nitric oxide reduction in a waste gas from a combustion plant, the catalyst comprising a catalytically active component which comprises vanadium, and a sacrificial component selected from at least one molecular sieve and from a clay mineral, wherein the at least one molecular sieve is substantially free of alkali metals and transition metals, wherein the sacrificial component absorbs catalyst poison in the waste gas.

US 2015/0071841 discloses a vanadium SCR catalyst for reducing nitric oxide in the waste gas waste gas of a biomass combustion plant. The catalyst comprises a sacrificial component selected from a zeolite and/or a clay mineral, in particular halloysite. During operation, catalyst poisons contained in the waste gas, in particular alkali metals, are absorbed by the sacrificial component so that catalytically active centers of the catalyst are not blocked by the catalyst poisons.

This invention describes a catalyst with relatively high SCR ($NO_x$ reduction) activity and Hg oxidation activity and, at the same time, relatively low $SO_2$ oxidation activity. Accordingly, it is an object of the invention to provide an improved catalyst, method and/or system compared to the prior art or at least to provide a commercially useful alternative thereto.

According to a first aspect there is provided a catalyst for treating an exhaust gas comprising $SO_2$, $NO_x$ and elemental mercury in the presence of a nitrogenous reductant, the catalyst comprising a composition containing oxides of:
(i) Molybdenum (Mo) and/or Tungsten (W);
(ii) Vanadium (V);
(iii) Titanium (Ti), and
(iv) an MFI zeolite,
wherein the composition comprises, based on the total weight of the composition:
(i) 1 to 6 wt % of MoO3 and/or 1 to 10 wt % $WO_3$, and
(ii) 0.1 to 3 wt % $V_2O_5$, and
(iii) 48.5 to 94.5 wt % TiO2; and
(iv) 35 to 50 wt % MFI zeolite.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous. It is intended that the features disclosed in relation to the product may be combined with those disclosed in relation to the method and vice versa.

Furthermore, the term "comprising" as used herein can be exchanged for the definitions "consisting essentially of" or "consisting of". The term "comprising" is intended to mean that the named elements are essential, but other elements may be added and still form a construct within the scope of the claim. The term "consisting essentially of" limits the scope of a claim to the specified materials or steps and those that do not materially affect the basic and novel characteristic(s) of the claimed invention. The term "consisting of" closes the claim to the inclusion of materials other than those recited except for impurities ordinarily associated therewith.

The present invention relates to a catalyst for treating an exhaust gas comprising $SO_2$, $NO_x$ and elemental mercury. These gases are included in the exhausts of certain combustion systems and, in particular, those from the boilers of coal or oil power plants.

The catalyst works to treat the exhaust gas in the presence of a nitrogenous reductant. Preferably the nitrogenous reducing agent is ammonia, hydrazine or an ammonia precursor selected from the group consisting of urea (($NH_2)_2$ CO), ammonium carbonate, ammonium carbamate, ammonium hydrogen carbonate and ammonium formate, or a mixture of two or more thereof. Systems for metering these agents into exhaust gas flows are well known in the art.

The catalyst comprises a composition. The composition contains oxides of Molybdenum (Mo) and/or Tungsten (W). These are preferably present in an amount of 1 to 6 wt % of $MoO_3$ and/or 1 to 10 wt % $WO_3$. More preferably the total is 2 to 4 wt % of $MoO_3$ or 4 to 9 wt % $WO_3$. Preferably the composition does not comprise $WO_3$ The composition of the catalyst comprises Vanadium (V) oxide. The term vanadium oxide, or $VO_N$, means an oxide of vanadium, preferably with vanadium in the +5 oxidation state dispersed on a mixed oxide support. The principle oxides of vanadium are: Vanadium (II) oxide (vanadium monoxide), VO; Vanadium(III) oxide (vanadium sesquioxide or trioxide), $V_2O_3$, Vanadium(IV) oxide (vanadium dioxide), $VO_2$, and Vanadium (V) oxide (vanadium pentoxide), $V_2O_5$. As discussed above, the V is present to act as an oxidation catalyst. The composition comprises 0.1 to 3 wt % $V_2O_5$, preferably 0.5 to 2.5 wt % $V_2O_5$.

The composition of the catalyst comprises Titanium (Ti) oxide. The Ti is present in the composition in an amount of 48.5 to 94.5 wt % $TiO_2$. Preferably the composition comprises 75 to 85 wt % $TiO_2$. The Ti oxides provide a catalytic base material for the catalytic composition.

The composition comprises a zeolite. The term zeolite is understood as meaning a framework aluminosilicate in which the ratio of the oxygen atoms to the sum of the aluminum and silicon atoms is 2:1. As a result of some silicon atoms of oxidation state IV being exchanged for aluminum atoms of oxidation state III, the framework or the framework structure overall acquires a negative charge. The negative charge is compensated for by cations that are in the framework structure. The cations are what are known as exchangeable cations that can readily be replaced by other cations, in particular metal cations, by ion exchange.

A zeolite is also distinguished by the fact that the framework structure has continuous pores with a characteristic pore width. MFI zeolites are a known class of zeolite characterized by the structure framework type.

Zeolites are classified on the basis of the molar ratio of silicon oxide to aluminum oxide or according to the characteristic framework structure resulting from the molar ratio. For classification purposes, reference is made to the article "Chemical Nomenclature and Formulation of Compositions of Synthetic and Natural Zeolites" by R. M. Barrer, Pure Appl. Chem. 51 (1979), pages 1091 to 1100.

The composition comprises an MFI zeolite in an amount of from 4 to 50 wt % based on the total weight of the composition. Preferably the composition comprises 10 to 20 wt % MFI zeolite. Useful MFI isotypes include ZSM-5, [Fe—Si-0]-MFI, AMS-1 B, AZ-1, Bor-C, Boralite, Encilite, FZ-1, LZ-105, Mutinaite, NU-4, NU-5, Silicalite, TS-1, TSZ, TSZ-III, TZ-01, USC-4, USI-108, ZBH, ZKQ-1 B, and ZMQ-TB, with ZSM-5 being particularly preferred. Typical $SiO_2/Al_2O_3$ mole ratios for such materials are 30 to 100. Such zeolites are known in the art and can be obtained commercially.

Unlike in the prior art, it is not preferred, in the catalyst plate according to the invention, for the zeolite of the active material to be a metal-cation-exchanged, i.e. for the exchangeable cations of the zeolite to be exchanged for metal cations, for example of copper or iron. Rather it is preferred that the zeolite is hydrogen-ion-exchanged. Preferably the MFI zeolite is an H-MFI zeolite. Preferably the MFI zeolite is an H-ZSM-5 zeolite.

The term hydrogen-ion-exchanged, acid zeolite is understood as being a zeolite in which the exchangeable cations have been predominantly exchanged for hydrogen ions. This can take place, for example, by thermal conversion of ammonium ($NH_4^+$) ions which are contained in synthetic zeolites, by hydrogen ion exchange or by hydrolysis of a multiply charged cation-containing zeolite during a dehydration. In this context, reference is made in particular to Kirk-Othmer, "Encyclopedia of Chemical Technology", 3rd Edition, Volume 15, John Wiley & Sons, New York, 1981, pages 640 to 669.

Preferably the composition does not comprise phosphorus. P acts as a poison for the activity of a catalytic formulation.

Preferably the catalytic components of the composition consist of the MFI zeolite and the oxides of Mo, W, V, and Ti, and most preferably the MFI zeolite and only oxides of Mo, V, and Ti. That is, preferably all of the catalytically active ingredients are only those listed above. In some embodiments the catalyst may further comprise certain binders and/or fillers as discussed below in combination with the catalyst. Preferably the catalyst is only the composition as described herein.

The catalyst is preferably provided on a substrate or as an extruded honeycomb structure to thereby form its own substrate. The term "substrate" means a solid material on which a film can be placed.

The substrate can be in the form of a monolith, plate, or sheet, preferably a plate or sheet. The substrate can be composed of a metal, preferably a steel, more preferably a stainless steel or a FeCr-alloy. The substrate is preferably fabricated from stainless steel and preferably has a relatively high geometric surface area. It may take the form of mesh, sheet, plate, monolith, honeycomb, or the like. Preferred substrates are perforated, as in stainless-steel mesh. Preferably, the substrate is capable of fluting, stacking, and/or arranging into stackable units or groups. The substrate is preferably calcined prior to being coated. For example, stainless-steel mesh is preferably heated in an oven, on a hotplate, or otherwise to 500° C. to 1000° C., preferably 600° C. to 900° C., prior to coating. The substrate may also by abrasively treated, such as by grit, or sand, blasting.

Preferably the catalyst is a plate catalyst. Preferably the plate comprises the catalyst in an amount of from 0.4 to 2 $kg/m^2$ and more preferably from 0.5 to 1.0 $kg/m^2$. Plate catalysts are well known in the art and typically contain an expanded metal sheet or perforated metal sheet onto which a catalyst composition mass is pressed and/or infiltrated and then calcined. Such a known process is described, for example, in U.S. Pat. No. 6,054,408.

When applying a catalyst composition to a substrate such as a plate, a paste may be used. Water is added to a chemically stabilized titanium dioxide of the anatase type to form a kneadable mass or composition, to which water-soluble compounds of molybdenum and vanadium, such as ammonium heptamolybdate and ammonium metavanadate, for example, are then added in accordance with intended concentrations, to form a mass. This mass is kneaded. After the desired water content of the mass has been set, inorganic minerals, such as clays and/or fiber materials such as glass fibers, for example, are added to the mass in a process to increase its mechanical strength. During this step, other additives, such as film forming agents, dispersing agents, thickening agents and the like, can also be added to the kneaded mass. The resulting mass is kneaded again to form a catalyst mass. The additives, which may include glass particles, alumina, silica, silica-aluminas, ceramics, clays, inorganic oxides, minerals, polymers, or other materials, make up the balance of the solids content.

As used herein, the term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi: 10.1351/ goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours. The calcination is preferably done under dry conditions, but it can also be performed hydrothermally, i.e., in the presence of some moisture content.

It has been surprisingly found that the catalysts typically have enhanced activity for $NO_x$ conversion at a temperature between 300° C. and 450° C., with at the same time minimized $SO_x$ conversion activity in the same temperature window, where the $NO_x$ and $SO_x$ conversions are measured at atmospheric pressure. These are the temperatures typically encountered in a so-called high dust position within a coal power plant exhaust, for example. Lower temperature ranges are encountered in so-called tail end positions.

The catalyst composition which is infiltrated into the substrate may be provided through the use of precursor materials which form oxides when calcined.

A suitable $VO_x$ precursor is a compound that contains vanadium and the compound forms an oxide of vanadium on calcination. Examples of such compounds include, to but are not limited to: vanadium oxysulfate, ammonium metavanadate, and vanadium oxytrichloride.

A suitable $MoO_x$ precursor is a compound that contains molybdenum and the compound forms an oxide of molybdenum on calcination. Examples of such compounds include, but are not limited to ammonium heptamolybdate, ammonium molybdate, molybdenum chloride, molybdenum oxalate, and molybdenum acetate.

A suitable $WO_x$ precursor is a compound that contains tungsten and the compound forms an oxide of tungsten on calcination. Examples of such compounds include, but are not limited to tungsten chloride, tungsten oxychloride, tungstic acid, ammonium metatungstate, ammonium paratungstate or premanufactured tungsten/titania.

A suitable $TiO_x$ precursor is a compound that contains titanium and the compound forms an oxide of titanium on calcination. Examples of such compounds include, but are not limited to titanium tetrachloride, titanium trichloride and titanium oxysulfate.

Raw materials employed for preparing the catalyst may be any of oxides and salts of the aforementioned catalyst components.

When a plurality of the thus-obtained plate-like catalysts are stacked through a known method, and then subjected to molding so as to have a predetermined shape, the resultant catalyst structure may be employed as a catalyst unit which causes less clogging in the treatment of exhaust gas from a coal-fired boiler. A reinforcing agent (e.g., inorganic fiber) or a particulate binder (e.g., silica sol) may be added to the paste containing the catalyst components.

Before the paste is applied to the substrate, the substrate is treated to remove oil, either by chemical washing or by thermal treatment.

According to a further aspect there is provided a method for treating an exhaust gas comprising $SO_2$, NOx and elemental mercury, the method comprising:

contacting a flow of exhaust gas with the catalyst described herein in the presence of a nitrogenous reducing agent to thereby provide a treated exhaust gas.

According to a further aspect there is provided an exhaust system for a combustion source for performing the method described herein, the system comprising a conduit for carrying a flowing exhaust gas, a source of nitrogenous reductant, a catalyst as described herein disposed in a flow path of the exhaust gas and means for metering nitrogenous reductant into a flowing exhaust gas upstream of the catalyst.

Preferably the system further comprises a wet scrubber for recovering oxidized mercury from the treated exhaust gas.

Suitable applications include, among others, exhaust gas treatment from stationary sources such as thermal power plants, gas turbines, coal-fired power and cogeneration plants, plant and refinery heaters and boilers used in the chemical and petrochemical industries, furnaces, coke ovens, coffee roasting plants, municipal waste plants, and incinerators.

Preferably the combustion source is a boiler, such as for a coal or oil power plant. The coated articles and regenerated articles are useful for power plants, especially plants that use sulfur containing fuels such as coal, oil etc. as the energy source. Power plant SCR catalysts normally operate at temperatures in the range of 300° C. to 450° C., at atmospheric pressure, and in a high particulate environment. The sulfur content of coal varies depending upon the type of coal, e.g. bituminous coal having a sulfur content of from 0.7 to 4.0%. Typically, the exhaust gas will have a sulfur content in the range of 500 to 1500 ppm sulfur, but in some sources, the sulfur content will be 2000 to 3000 ppm or higher. Sulfur-containing fuel sources can make it challenging to control the amount of $SO_2$ that gets further oxidized to $SO_3$. Power plants rely on SCR catalysts to remove $NO_x$, but they require catalysts having the ability to do so while also minimizing the rate of $SO_2$ oxidation.

The activity of the catalyst in NOx conversion can be determined by passing a gas comprising a mixture of NO, $NH_3$, $O_2$, H2O, $SO_2$ and N2 over an article having the catalyst composition at 382° C. where the article is contained in a reactor; and measuring the changes in the concentrations of NO. VGB Guideline for the Testing of DENOX Catalysts, VGB-R 302 He, $2^{nd}$ revised edition (1998) describes such a procedure. The concentrations of $NO_x$ can be determined using a FTIR gas analyzer or a chemiluminescent NOx analyzer. Similarly, the activity of the catalyst in $SO_x$ conversion can be determined by passing a gas comprising a mixture of 02, H2O, $SO_2$ and N2 over an article having the catalyst composition at 400° C. where the article is contained in a same type of reactor used for measuring $NO_x$ conversion; and measuring the changes in the concentrations of $SO_x$ by wet chemistry.

In a preferred embodiment, the catalyst is a plate catalyst comprising a composition containing oxides of Mo; V and Ti, and an MFI zeolite, preferably an H-ZSM5 zeolite; wherein, the composition comprises, based on the total weight of the composition, 2 to 4 wt % $MoO_3$, about 0.5 wt % or about 2.5 wt % $V_2O_5$, 15 to 25 wt % MFI zeolite and the balance $TiO_2$.

In a preferred embodiment, the catalyst is a plate catalyst comprising a composition containing oxides of Mo; V and Ti, and an MFI zeolite, preferably an H-ZSM5 zeolite; wherein, the composition comprises, based on the total weight of the composition, 2 to 4 wt % $MoO_3$, about 0.5 wt % or about 2.5 wt % $V_2O_5$, 35 to 45 wt % MFI zeolite and the balance $TiO_2$.

Preferably these catalysts are provided in an exhaust system for a coal or oil power plant for performing the method as described herein, the system comprising a conduit for carrying a flowing exhaust gas, a source of nitrogenous reductant, the catalyst disposed in a flow path of the exhaust gas and means for metering nitrogenous reductant into a flowing exhaust gas upstream of the catalyst.

EXAMPLES

The present invention will next be specifically described in detail by way of the following non-limiting examples.

Preparation of Comparative Example 1 (Ref. 1.2% $V_2O_5$/TiMo)

A catalyst comprising 1.2 wt. % $V_2O_5$ and 2.7 wt. % $MoO_3$ on $TiO_2$ was prepared by combining titania with ammonium metavanadate and ammonium heptamolybdate to with clay, fibers and organic binders and then kneading into a paste. The paste was laminated onto stainless-steel mesh to a thickness of 0.8 mm and calcined to form a plate-type catalyst.

Preparation of Comparative Example 2 (Ref. 2.2% $V_2O_5$/TiMo)

A catalyst comprising 2.2 wt. % $V_2O_5$ and 2.7 wt. % $MoO_3$ on $TiO_2$ was prepared by combining titania with ammonium metavanadate and ammonium heptamolybdate with clay, fibers and organic binders and then kneading into a paste. The paste was laminated onto stainless-steel mesh to a thickness of 0.8 mm and calcined to form a plate-type catalyst.

Preparation of Example 1 (1.2% $V_2O_5$/TiMo+16% H-MFI)

A catalyst comprising 1.2 wt. % $V_2O_5$, 2.7 wt. % $MoO_3$ on $TiO_2$ and 16 wt. % Zeolite (H-MFI) was prepared by combining titania with ammonium metavanadate, ammonium heptamolybdate and Zeolite (H-MFI) with clay, fibers and organic binders and then kneading into a paste. The paste was laminated onto stainless-steel mesh to a thickness of 0.8 mm and calcined to form a plate-type catalyst.

P Preparation of Example 2 (1.2% $V_2O_5$/TiMo+40% H-MFI)

A catalyst comprising 1.2 wt. % $V_2O_5$, 2.7 wt. % $MoO_3$ on $TiO_2$ and 40 wt. % Zeolite (H-MFI) was prepared by combining titania with ammonium metavanadate, ammonium heptamolybdate and Zeolite (H-MFI) with clay, fibers and organic binders and then kneading into a paste. The paste was laminated onto stainless-steel mesh to a thickness of 0.8 mm and calcined to form a plate-type catalyst.

Preparation of Example 3 (2.2% $V_2O_5$/TiMo+13% H-MFI)

A catalyst comprising 2.2 wt. % $V_2O_5$, 2.7 wt. % $MoO_3$ on $TiO_2$ and 13 wt. % Zeolite (H-MFI) was prepared by combining titania with ammonium metavanadate, ammonium heptamolybdate and Zeolite (H-MFI) and then kneading into a paste. The paste was laminated onto stainless-steel mesh to a thickness of 0.8 mm and calcined to form a to plate-type catalyst.

Preparation of Example 4 (2.2% $V_2O_5$/TiMo+16% H-MFI

A catalyst comprising 2.2 wt. % $V_2O_5$, 2.7 wt. % $MoO_3$ on $TiO_2$ and 16 wt. % Zeolite (H-MFI) was prepared by combining titania with ammonium metavanadate, ammonium heptamolybdate and Zeolite (H-MFI) with clay, fibers and organic binders and then kneading into a paste. The paste was laminated onto stainless-steel mesh to a thickness of 0.8 mm and calcined to form a plate-type catalyst. Two samples (Example 4A and 4B) were tested and are reported in the Table below.

Preparation of Example 5 (2.2% $V_2O_5$/TiMo+19% H-MFI)

A catalyst comprising 2.2 wt. % $V_2O_5$, 2.7 wt. % $MoO_3$ on $TiO_2$ and 19 wt. % Zeolite (H-MFI) was prepared by combining titania with ammonium metavanadate, ammonium heptamolybdate and Zeolite (H-MFI) with clay, fibers and organic binders and then kneading into a paste. The paste was laminated onto stainless-steel mesh to a thickness of 0.8 mm and calcined to form a plate-type catalyst.

Preparation of Example 6 (2.2% $V_2O_5$/TiMo+40% H-MFI)

A catalyst comprising 2.2 wt. % $V_2O_5$, 2.7 wt. % $MoO_3$ on $TiO_2$ and 40 wt. % Zeolite (H-MFI) was prepared by combining titania with ammonium metavanadate, ammonium heptamolybdate and Zeolite (H-MFI) with clay, fibers and organic binders and then kneading into a paste. The paste was laminated onto stainless-steel mesh to a thickness of 0.8 mm and calcined to form a plate-type catalyst.

Preparation of Comparative Example 7—1.2% $V_2O_5$/TiMo+16% MOR

A catalyst comprising 1.2 wt. % $V_2O_5$, 2.7 wt. % $MoO_3$ on $TiO_2$ and 16 wt. % mordenite Zeolite (MOR) was prepared by combining titania with ammonium metavanadate, ammonium heptamolybdate and mordenite Zeolite (MOR) with clay, fibers and organic binders and then kneading into a paste. Crystalline ammonium heptamolybdate tetrahydrate was added directly into the paste, and the mixture was further kneaded. The paste was laminated onto stainless-steel mesh to a thickness of 0.8 mm and calcined to form a plate-type catalyst.

Preparation of Example 8—1.2% $V_2O_5$/TiMo+16% FeMFI

A catalyst comprising 1.2 wt. % $V_2O_5$, 2.7 wt. % $MoO_3$ on $TiO_2$ and 16 wt. % Zeolite (Fe-MFI) was prepared by combining titania with ammonium metavanadate, ammonium heptamolybdate and Fe-Zeolite (Fe-MFI) with clay, fibers and organic binders and then kneading into a paste. Crystalline ammonium heptamolybdate tetrahydrate was added directly into the paste, and the mixture was further kneaded. The paste was laminated onto stainless-steel mesh to a thickness of 0.8 mm and calcined to form a plate-type catalyst.

Preparation of Comparative Example 3—0.6% $V_2O_5$/TiMo

A catalyst comprising 0.6 wt. % $V_2O_5$ and 2.7 wt. % $MoO_3$ on $TiO_2$ was prepared by combining titania with ammonium metavanadate and ammonium heptamolybdate with clay, fibers and organic binders and then kneading into a paste. Crystalline ammonium heptamolybdate tetrahydrate was added directly into the paste, and the mixture was further kneaded. The paste was laminated onto stainless-steel mesh to a thickness of 0.8 mm and calcined to form a plate-type catalyst.

Preparation of Example 9—0.6% $V_2O_5$/TiMo+16% H-MFI

A catalyst comprising 0.6 wt. % $V_2O_5$, 2.7 wt. % $MoO_3$ on $TiO_2$ and 16 wt. % Zeolite (H-MFI) was prepared by combining titania with ammonium metavanadate, ammonium heptamolybdate and Zeolite (H-MFI) with clay, fibers and organic binders and then kneading into a paste. Crystalline ammonium heptamolybdate tetrahydrate was added directly into the paste, and the mixture was further kneaded. The paste was laminated onto stainless-steel mesh to a thickness of 0.8 mm and calcined to form a plate-type catalyst.

General Procedure for Evaluating $NO_z$, $SO_S$ & Hg Conversion

Each catalyst plate was first cut into strips with the dimensions of 25 mm×400 mm. Four of these strips were then mounted vertically in a reaction tube and a synthetic gas mixture was passed through the reaction tube. The synthetic gas mixture for NOR, SON, and Hg testing were different for each test and the compositions and conditions of these synthetic gas mixtures are provided in the table below.

1. Hg Testing:
   The compositions of inlet and outlet gases to and from the reactor were determined by on-line FTIR spectroscopy, which analyzes for multiple compounds simultaneously. The FTIR sample cell temperature was kept at about 230° C. to avoid water condensation and salt formation inside the instrument. The Hg concentrations were analyzed at both the inlet and outlet of the reactor using a commercial Continuous Emissions Monitor (CEM) that uses Cold Vapor Atomic Fluorescence Spectroscopy (CVAFS). The Hg conversion was calculated using the inlet and outlet concentrations of elemental Hg.

2. NOx Testing:

The percent $NO_x$ removal was determined through measurement of $NO_x$ concentration at the inlet and outlet of a catalyst layer by means of a chemiluminescent $NO_x$ analyzer.

3. $SO_x$ Testing:

Percent $SO_2$ oxidation was determined through measurement of $SO_3$ concentration at the outlet of the catalyst layer by wet chemistry.

TABLE 1 test parameters

| Conditions | Hg Test | $NO_x$ Test | $SO_x$ Test |
|---|---|---|---|
| Temperature (° C.) | 380 | 350 | 400 |
| Total Flow (L/min) | 30 | 74 | 16.6 |
| Area Velocity (m/hr) | 22.5 | 55.5 | 12.5 |
| Linear Velocity (m/s) | 0.69 | 1.71 | 0.39 |
| Space Velocity ($hr^{-1}$) | 6237 | 15400 | 3470 |
| $NH_3$ (ppm) | 24 | 400 | 0 |
| NO (ppm) | 60 | 400 | 0 |
| $SO_2$ (ppm) | 425 | 500 | 500 |
| $O_2$ (%) | 6 | 5 | 5 |
| $H_2O$ (%) | 11 | 10 | 10 |
| HCl (ppm) | 15 | 0 | 0 |
| Hg ($ug/m^3$) | 10 | 0 | 0 |

TABLE 2 results of the testing

| | wt % $V_2O_5$ | wt % H-MFI | Hg conv. (%) | $SO_x$ conv. (%) | $kNO_x$ (m/hr) |
|---|---|---|---|---|---|
| Comparative Example 1 (Ref 1.2) | 1.2 | 0 | 41.5 | 1.2 | 42.5 |
| Example 1 (15073) | 1.2 | 16 | 57.0 | 1.35 | 42.4 |
| Example 2 (15418) | 1.2 | 40 | 54.01 | 1.05 | 37.6 |
| Comparative Example 2 (Ref 2.2) | 2.2 | 0 | 55.6 | 2.1 | 46.7 |
| Example 3 (15312) | 2.2 | 13 | 63.9 | 2.0 | 46.6 |
| Example 4A (15220) | 2.2 | 16 | 66.4 | 2.6 | 45.4 |
| Example 4B (15287) | 2.2 | 16 | 69.1 | 2.0 | 43.7 |
| Example 5 (15313) | 2.2 | 19 | 62.6 | 2.2 | 46.3 |
| Example 6 (15417) | 2.2 | 40 | 65.1 | 1.4 | 42.5 |
| Comparative Example 7 (MOR) | 1.2 | 16 | 52.8 | 0.9 | 39.7 |
| Example 8 (Fe-MFI) | 1.2 | 16 | 56.3 | 3.8 | 42.6 |
| Comparative Example 3 (Ref. 0.6) | 0.6 | 0 | 37 | 0.55 | 23.0 |
| Example 9 (160065) | 0.6 | 16 | 37.5 | 0.62 | 29.0 |

As is clear from test data of the catalysts, the catalyst of the present invention has good performance; i.e., maintains high levels of $NO_x$ removal and high mercury oxidation activity, and low levels of $SO_2$ oxidation.

As demonstrated, the inventive Examples 1-6 have improved Hg oxidation activity and comparable or better $SO_x$ and $NO_2$ activity than those comparative compositions without the MFI zeolite. As demonstrated by Example 7, the use of the MFI zeolite, especially H-ZSM5 zeolite, is much more effective than mordenite. As demonstrated to by Example 8, the use of the H-MFI zeolite is better than iron promoted-MFI zeolite because the latter demonstrates excessive $SO_x$ oxidation.

Although preferred embodiments of the invention have been described herein in detail, it will be understood by those skilled in the art that variations may be made thereto without departing from the scope of the invention or of the appended claims.

For the avoidance of doubt, the entire contents of all documents acknowledged herein are incorporated herein by reference.

The invention claimed is:

1. A catalyst for treating an exhaust gas comprising $SO_2$, $NO_x$ and elemental mercury in the presence of a nitrogenous reductant, the catalyst comprising a composition containing oxides of:
   (i) Molybdenum (Mo) and/or Tungsten (W);
   (ii) Vanadium (V);
   (iii) Titanium (Ti); and
   (iv) an MFI zeolite,
   wherein the composition comprises, based on the total weight of the composition:
   (i) 1 to 6 wt % of $M_oO3$ and/or 1 to 10 wt % $WO_3$; and
   (ii) 0.1 to 3 wt % $V_2O_5$; and
   (iii) 48.5 to 94.5 wt % $TiO_2$; and
   (iv) 35 to 50 wt % MFI zeolite.

2. The catalyst according to claim 1, wherein the composition does not comprise phosphorus.

3. The catalyst according to claim 1, wherein the composition consists of the MFI zeolite and the oxides of Mo, W, V, and Ti.

4. The catalyst according to claim 1, wherein the catalyst is a plate catalyst.

5. The catalyst according to claim 1, wherein the MFI zeolite is an H-MFI zeolite.

6. The catalyst according to claim 1, wherein the MFI zeolite is an H-ZSM-5 zeolite.

7. A method for treating an exhaust gas comprising $SO_2$, $NO_x$ and elemental mercury, the method comprising:
   contacting a flow of exhaust gas with the catalyst of claim 1 in the presence of a nitrogenous reducing agent to thereby provide a treated exhaust gas.

8. The method according to claim 7, wherein the nitrogenous reducing agent is ammonia, hydrazine or an ammonia precursor selected from the group consisting of urea (($NH_2$)$_2$CO), ammonium carbonate, ammonium carbamate, ammonium hydrogen carbonate and ammonium formate.

9. The exhaust system of claim 8, wherein the combustion source is a furnace or a boiler, of a coal or oil power plant, a cement plant or a waste incinerator.

10. A exhaust system for a combustion source for treating an exhaust gas comprising $SO_2$, $NO_x$ and elemental mercury, the system comprising a conduit for carrying a flowing exhaust gas, a source of nitrogenous reductant, a catalyst according to claim 1 disposed in a flow path of the exhaust gas and means for metering nitrogenous reductant into a flowing exhaust gas upstream of the catalyst.

11. The exhaust system according to claim 10, the system further comprising a wet or a dry scrubber for recovering oxidized mercury from the treated exhaust gas.

\* \* \* \* \*